US008732619B2

(12) United States Patent
Knitowski et al.

(10) Patent No.: US 8,732,619 B2
(45) Date of Patent: May 20, 2014

(54) METHODS AND SYSTEMS FOR INTERACTIVE USER INTERFACE OBJECTS

(75) Inventors: Alan S. Knitowski, Austin, TX (US); Luan Dang, Newport Beach, CA (US); David J. Reese, Austin, TX (US); James D. Trim, Pflugerville, TX (US); Anthony C. Hall, Austin, TX (US); Cyrus Lum, Austin, TX (US)

(73) Assignee: Phunware, Inc., Austin, TX (US)

( * ) Notice: Subject to any disclaimer, the term of this patent is extended or adjusted under 35 U.S.C. 154(b) by 315 days.

(21) Appl. No.: 13/076,370

(22) Filed: Mar. 30, 2011

(65) Prior Publication Data

US 2011/0265043 A1 Oct. 27, 2011

Related U.S. Application Data

(60) Provisional application No. 61/319,840, filed on Mar. 31, 2010.

(51) Int. Cl.
*G06F 3/0481* (2013.01)

(52) U.S. Cl.
CPC .................................. *G06F 3/04812* (2013.01)
USPC ............................ 715/846; 715/835; 715/837

(58) Field of Classification Search
CPC G06F 3/04812; G06F 3/04817; G06F 3/0484
USPC ........................................................ 715/835
See application file for complete search history.

(56) References Cited

U.S. PATENT DOCUMENTS

| 6,160,553 | A * | 12/2000 | Robertson et al. ............ 715/767 |
| 6,968,511 | B1 * | 11/2005 | Robertson et al. ............ 715/835 |
| 7,519,917 | B2 * | 4/2009 | Lewis-Bowen et al. ...... 715/772 |
| 7,562,312 | B2 * | 7/2009 | Rochford et al. ............. 715/848 |
| 8,234,581 | B2 * | 7/2012 | Kake .............................. 715/764 |
| 8,266,550 | B1 * | 9/2012 | Cleron et al. .................. 715/863 |
| 8,289,288 | B2 * | 10/2012 | Whytock et al. .............. 345/173 |
| 8,370,761 | B2 * | 2/2013 | Good et al. .................... 715/767 |
| 2004/0066414 | A1 | 4/2004 | Czerwinski et al. |

(Continued)

FOREIGN PATENT DOCUMENTS

JP 2009-277191 A 11/2009

OTHER PUBLICATIONS

International search report and written opinion dated Nov. 15, 2011 for PCT Application No. US2011/30607.

*Primary Examiner* — Alvin Tan
(74) *Attorney, Agent, or Firm* — Wilson Sonsini Goodrich & Rosati

(57) ABSTRACT

Methods and systems for interactive user interface objects are provided. The user interface allows for users to manipulate different objects represented by icons within a user interface, such as that of an iPhone or iPad or other touch screen devices. Users may bump objects together, flick one object towards another, bump an object against the edge of a screen, flick an object towards a certain area such as a dock, or otherwise manipulate the objects. The user's actions or manipulations of objects may result in an action by the objects or may have no effect. Depending on the compatibility of objects, the objects may be neutral towards one another, may attract each other, or may repel. The objects that attract may share content or communicate with each other via a one-time interaction, or may establish links or connections with each other that enable longer term communication or broadcasts that occur upon pre-determined triggers.

19 Claims, 7 Drawing Sheets

(56) References Cited

U.S. PATENT DOCUMENTS

| | | |
|---|---|---|
| 2007/0016872 A1 | 1/2007 | Cummins et al. |
| 2007/0036346 A1 | 2/2007 | Kwon |
| 2009/0031253 A1* | 1/2009 | Lee et al. ............ 715/835 |
| 2009/0100343 A1* | 4/2009 | Lee et al. ............ 715/733 |

* cited by examiner

METHODS AND SYSTEMS FOR INTERACTIVE USER INTERFACE OBJECTS

CROSS-REFERENCE

This application claims the benefit of U.S. Provisional Application No. 61/319,840 filed on Mar. 31, 2010, which application is incorporated herein by reference in its entirety.

BACKGROUND

Application users are often forced to interact with content and objects leveraging a static, mechanical methodology. While the underlying content or objects typically provide utility and value to the application user, the interface provided is not typically engaging, playful, fun or based on any specific scientific properties.

Today's application users deserve more in their consumption of multimedia, including content and objects, and the application users should be able to be as engaged by the user interface and experience provided for navigating and interacting with the application as the underlying content and objects themselves.

What is needed is a dynamic, interactive interface based on math, science and physics that allows for interoperability and connections between applications or objects in a multi-touch interface where the user engagement is as core to the underlying experience as the content and objects themselves.

SUMMARY

The invention provides systems and methods for interactive user interface objects. Various aspects of the invention described herein may be applied to any of the particular applications set forth below. The invention may be applied as a standalone system or as a component of an integrated software solution for programmable devices and their frameworks. The invention can be optionally integrated into existing business and processes seamlessly. It shall be understood that different aspects of the invention can be appreciated individually, collectively or in combination with each other.

In one aspect, a user interface for displaying interoperability of objects may include a graphical depiction of at least one object on a display screen; input variables for receiving inputs from a user to associate the at least one object with a second object; a graphical depiction of an action based on an interoperability dynamic of the at least one object with the second object. The interoperability dynamic may be to repel, attract or remain neutral.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of a preferred embodiment. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

In the following detailed description, numerous specific details are set forth in order to provide a thorough understanding of the invention. However it will be understood by those of ordinary skill in the art that the invention may be practiced without these specific details. In other instances, well-known methods, procedures, components and circuits have not been described in detail so as not to obscure the invention. Various modifications to the described embodiments will be apparent to those with skill in the art, and the general principles defined herein may be applied to other embodiments. The invention is not intended to be limited to the particular embodiments shown and described.

In current user interfaces, objects are often displayed as icons in an environment. For example, on an iPhone interface, each application is represented by an icon. These icons are forms of objects within a user interface. Currently, users may move these objects around, rearrange these objects within an environment, and interact with these objects individually and separately. Utilizing embodiments of the present invention, however, users may be able to interact with these objects (interactive objects or icons) in new and innovative ways. For example, users may "play with" or move the objects around such that the objects interact with each other. Users may bump objects together, or flick one object or icon into another object. Users may rearrange objects and place objects on top of each other or into each other, or even on a dock. The objects may be "thrown" to a dock, bounced off one another, connected with one another, bounced off the edge of the screen, etc. As the users interact with objects, the objects may react such that certain events are triggered by the users' actions.

Figure 1:
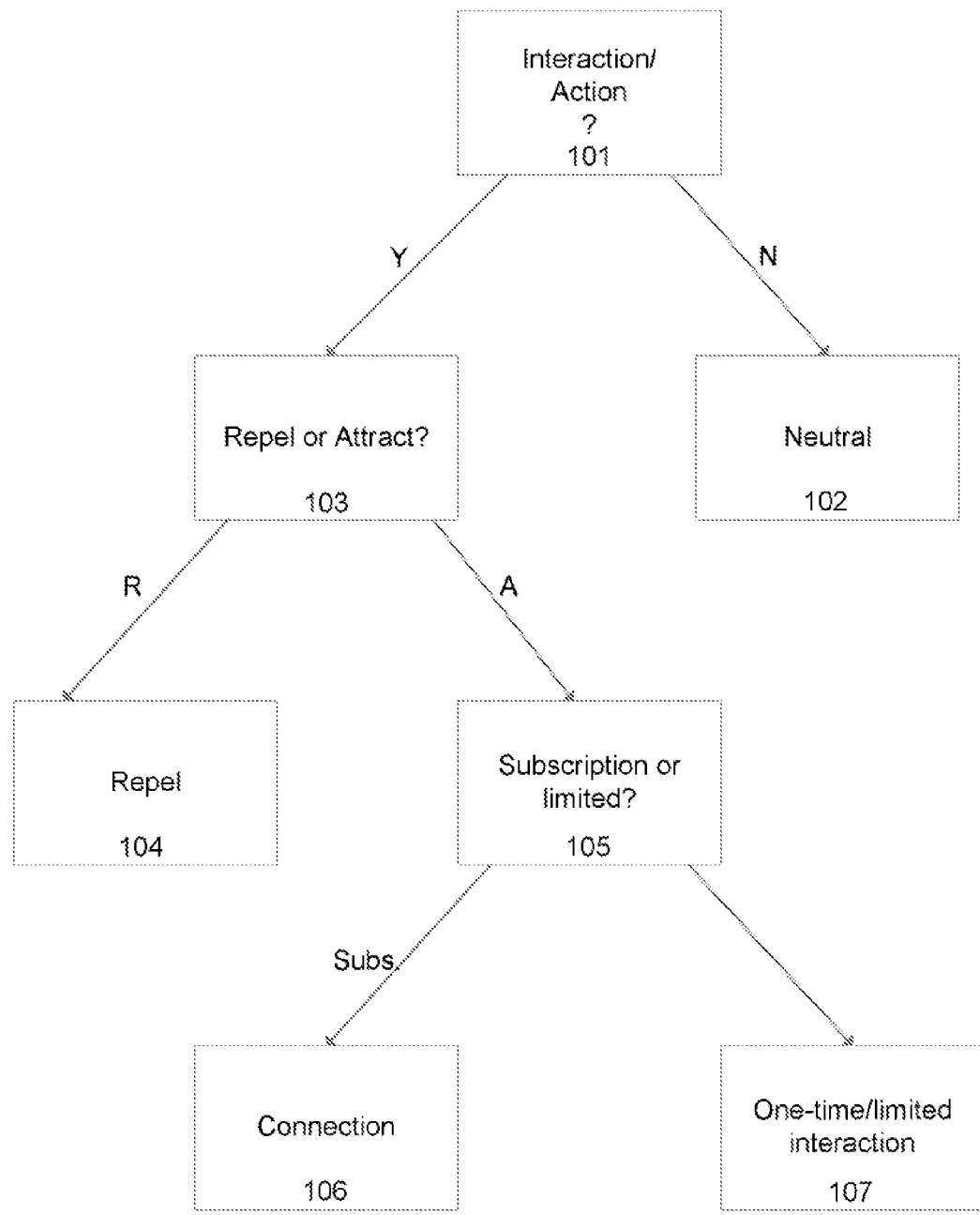
FIG. 1 illustrates an example of a decision tree of the interaction of objects, in accordance with embodiments of the invention.

Referring to FIG. 1, an example of a decision tree of the interaction of objects is shown, in accordance with embodiments of the invention. A user may interact with an object in a number of ways. In one embodiment, a user may bump two objects together, flick one object into another object, or place one object on top of another object. In each of these situations, the objects may either interact with each other or have a certain action or not (101). If the objects do not interact or have no action, then they are considered neutral towards each other (102). Neutral may mean that when two objects are bumped together or flicked into one another, nothing happens. If the objects are able to interact, then they may either repel each other or attract to one another (103). If the objects are not compatible (as discussed in more detail below), then they may repel one another. For example, two social networking objects such as a Facebook application object and a Twitter application object might repel. These two objects might repel to ensure that there is enough distance between them so that a third object may be easily flicked towards either the Facebook application object or the Twitter application object.

If the objects, on the other hand, are compatible for interaction, they may either establish a connection or link to one other for a subscription based interaction (or a longer period of interaction) or they may engage in a one-time or limited interaction (105). If it is a subscription-based interaction, the two objects may establish a connection (106) in which they are able to communicate or broadcast content to one another for some pre-determined period of time or perpetually. If it is a one-time or limited interaction, then the two objects may share or communicate certain content at that instance (107). For example, if a user flicks a content object (such as a picture, video, etc.) onto the Facebook application object (icon), then the Facebook application could post the content to the user's Facebook page or wall. In this case, Facebook would attract content, and the content would have a one-time interaction with the Facebook object.

In one embodiment, in addition to attracting or repelling one another, two objects may also orbit each other. For example, a social networking application object could orbit a Community object. The social networking application object may be a submenu and the Community object may be the top menu. In this example, an object that orbits another object is a submenu of the object that it is orbiting. In another situation, when two objects are connected, sharing content, or otherwise linked, one of those objects may orbit the other object. There may be various other situations in which objects may orbit one another.

In another example, a user may bump a game application object against their Twitter application object (or to their Facebook application object or other social networking object). Instead of bumping the two icons together, the user could also flick one to another, or place one atop of another, or any other action that causes triggers an interaction between the two objects. If the Twitter application object is capable of communicating with the game application object, then the two objects (or content modules) could establish a connection or link that allows them to communicate with each other or share content until the objects are disconnected. The objects may be disconnected by the user or after some pre-defined period of time. When connected, for example, achievements in the game object may be automatically broadcast via the social networking object that the user has connected the game object to. Thus, content (or achievements) from one application could automatically be shared virally and socially through the other application, which may be a social networking application object (or through all of the user's social networking accounts that the user chooses to "connect"). It may be possible for an object to establish connections or engage in one-time interactions with one or more other objects. It may also be possible that various objects cannot or are not set up to interact with each other.

In yet another example, two social networking objects could be connected. For example, the Facebook application object and the Twitter application object may be connected, so that whatever the user broadcasts or posts to Facebook is automatically posted and broadcasted via the Twitter application as well, and vice versa. When connected, the two social networking objects may share content, postings and updates.

Figure 2:
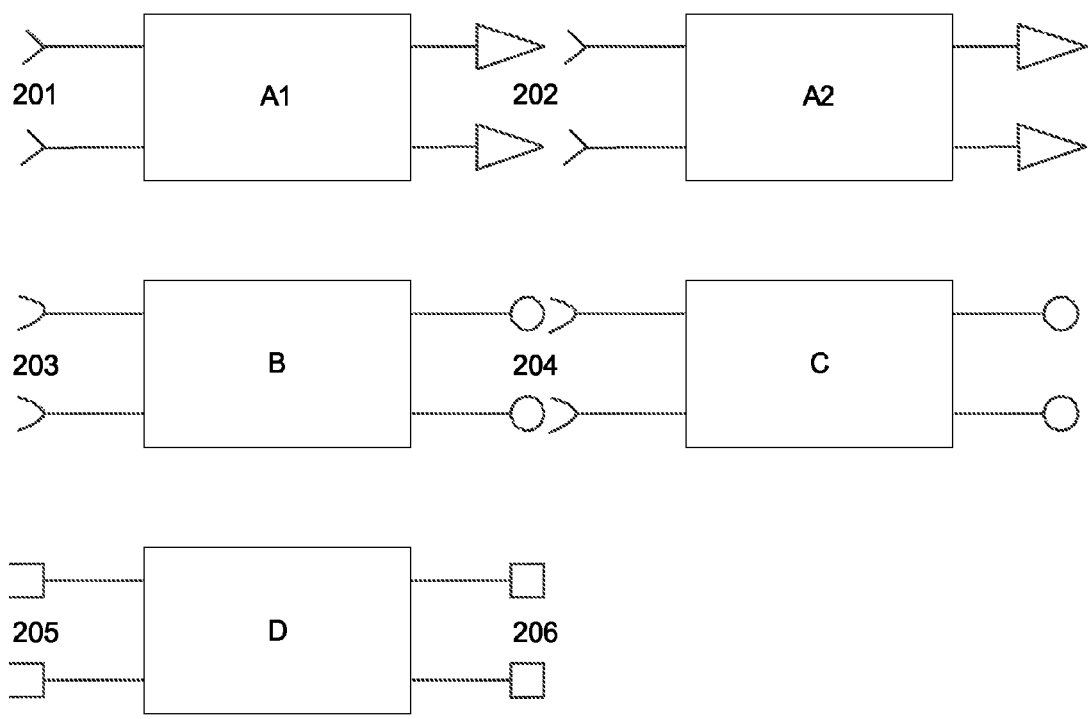
FIG. 2 illustrates a representation of the compatibility of objects, in accordance with embodiments of the invention.

FIG. 2 illustrates a representation of the compatibility of objects in accordance with embodiments of the invention. Referring to FIG. 2, whether or not objects are able to interact with each other may be defined by predetermined variables. Certain objects may be able to provide content or send messages or other communication to certain other objects, and certain other objects may be able to receive content or receive messages or other communication from certain other objects. For example, as shown in FIG. 2, object A1 may be able to receive communication only from other objects like object A2. These objects might "speak the same language" or use the same variables or types of content that are able to be shared with one another.

On object A1, the triangle shaped inputs 201 represent the kinds of inputs, content, communication, etc. that an object may be able to receive, and the triangle shaped outputs 202 represent the types of outputs, content, communication, etc. that object A1 is able to provide to other objects. Thus, object A1 may send output to other objects that are able to receive triangle-type inputs like 201. Similarly, object B can only communicate its outputs with objects like object C who are able to receive circle-type inputs like 203 or 204. And object D may only communicate its outputs or receive inputs from and with other objects like itself. The shapes of the inputs and outputs represent the types of messages, communication, content, etc. that are used by each of the applications (objects) within an interface.

When two objects, such as A1 and A2, or B and C have compatible inputs and outputs, then they are able to establish either a one-time or longer-term connection so that they may interact with one another. Two objects that have compatible inputs and outputs may attract one other, whereas two objects that do not have compatible inputs and outputs, such as object B and object D may repel one another. When a user thus places object B on top of object C, or bumps object B and C together, or flicks object B to object C or flicks object C to object B, then those two objects will interact and something will happen, such as the sharing of content, for example. When a user places object B on top of object D, or bumps object B and D together, or flicks object B to object D, they may either repel, or they may do nothing, depending on how incompatible these two objects are.

Figure 3:
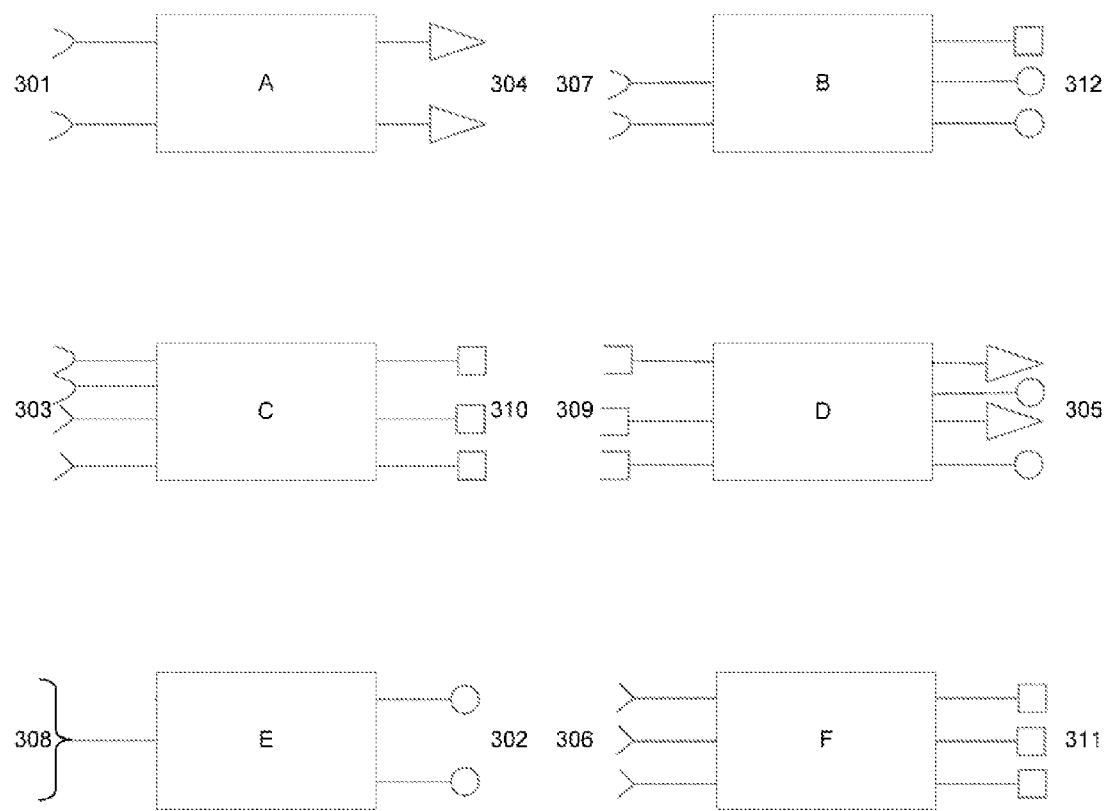
FIG. 3 illustrates more complex inputs and outputs of objects, in accordance with embodiments of the invention.

Referring to FIG. 3, more complex inputs and outputs of object are shown, in accordance with embodiments of the invention. As shown in FIG. 3, an object such as object A may be compatible with objects that are unlike itself. For example, while object A may have outputs that are able to communicate with other objects that are able to receive inputs that are triangle-shaped, it may only be able to receive inputs from other objects that have circle-shaped outputs. Thus, in FIG. 3, object A may establish a connection or have a one-time interaction with object E, as the output of object E 302 is compatible with the input of object A. Further, object E may also be able to establish a connection or have a one-time interaction with object C, as the output of object E 302 is compatible with the input of object C 303. Object C may also be able to communicate, establish a connection with, or have a one-time interaction with object A, as the input of object C 303 is compatible with the output of object A 304. Each object may be a content receiver or consumer or a content producer or both, and depending on whether the content is compatible, the objects may be able to interact.

As shown by object C, an object may have inputs that can receive multiple types of other object outputs. Similarly, as shown by object D, an object may have outputs that may be compatible with various types of other object inputs. For example, object D's outputs 305 may be compatible with the inputs of object A 301, object B 307, object C 303, and object F 306. Object A's outputs 304 may be compatible with object C's inputs 303 and object F's inputs 306, but depending on the strength of the compatibility, the objects may attract each other more or less. For example, object D's inputs 309 may be strongly attracted to object C's outputs 310 because they are highly compatible, and these objects may gravitate towards one another within the interface. In contrast, object F's outputs 311 may be highly incompatible with object B's inputs 307, and object B's outputs 312 may be highly incompatible with object F's inputs 306, so these two objects may repel each other.

Object E may have a universal input 308 such that it may accept outputs from all types of objects. For example, object E may be a Dock object (as described further below) that is able to attract or be attracted to any object.

Figure 4:
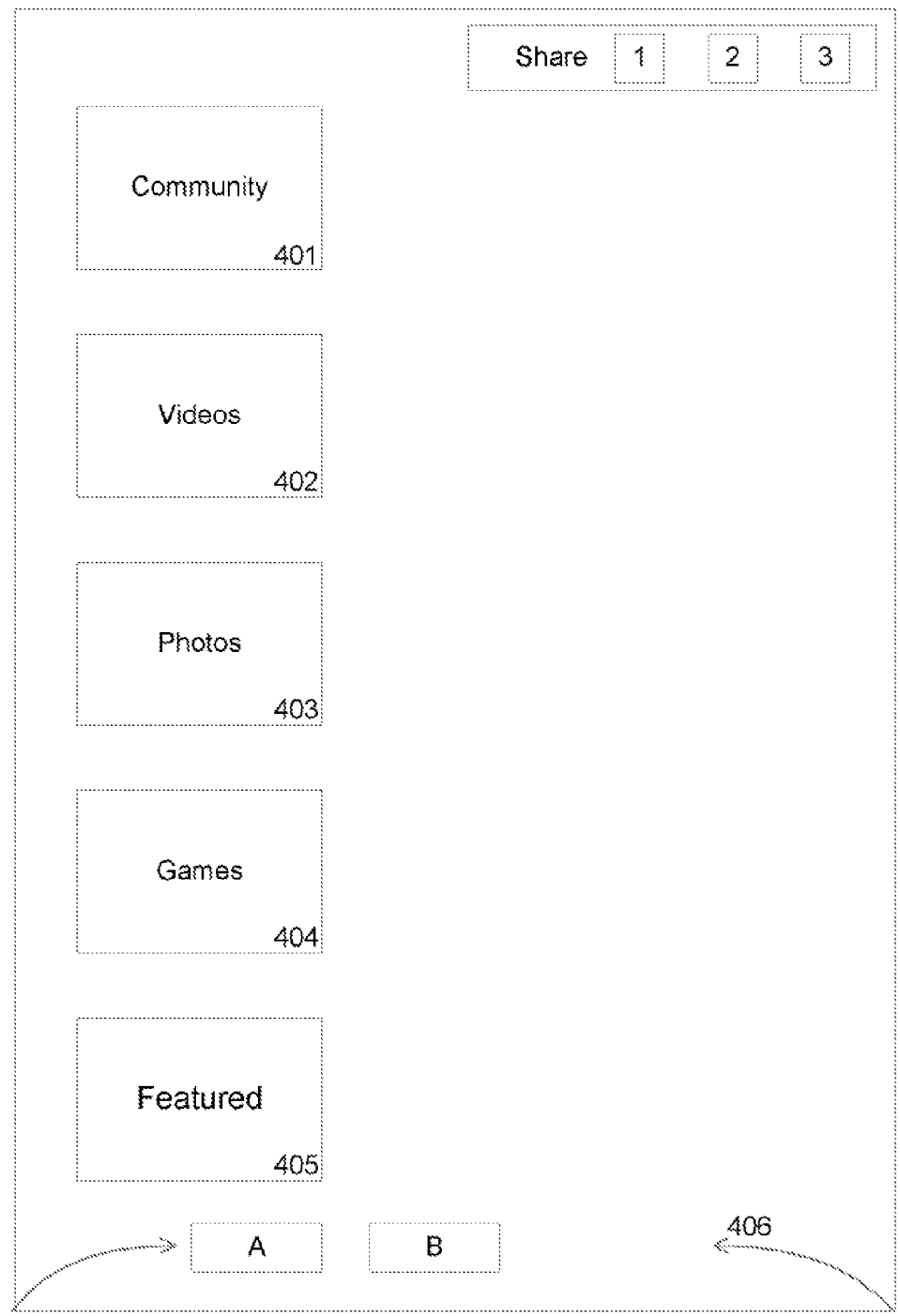
FIG. 4 illustrates an example of a display of a user interface, in accordance with embodiments of the invention.

Referring to FIG. 4, an example of a display of a user interface is shown, in accordance with embodiments of the invention. Various objects 401, 402, 403, 404, 405, A, B, 1, 2, 3 may be available to the user to interact with. The user may drag and drop these objects onto one other, bump these objects into each other, bump them off of the edge of the screen, flick them towards one another, etc. Various objects may be expanded or condensed. For example, expanding the photos object 403 might reveal several other objects within the photos object 403. The photos object 403 might represent a stack of other objects or icons that may be displayed and interacted with similar to a deck of cards, for example. A pile of objects may be swapped and displayed and interacted with using multi-touch interface features. For example, a user may use one finger as an anchor point and another finger to reveal each object within the pile of objects. By flicking the photos object 403, or an object (such as an individual photo or some subset of photos) within the photos object 403, to another object, such as the community object 401, the user might find that the photos object 403 (or the object within the photos object 403) is compatible with the community object 401, and by flicking the objects or bumping them together, the user's selected photo(s) are shared in the community 401.

In another example, if there is featured content 405 that is interesting, a user could flick or move it on top of the community object 401 to feature that content to other members of the user's community. Or, the user could take content within the videos object 402 and flick it into the featured 405 object to feature that content. The user may establish connections or links between the featured object 405 and their photos object 403, for example, to establish a link between the two to share content. The connection or link may be established for a certain period of time, or may persist until the user disconnects the two objects. In some situations, the connection may be established permanently.

Each object (or content) may also have a natural "home" and the object may gravitate towards that "home" at all times. Or, the object may simply return to its natural "home" when the user is finished interacting with that object. For example, the "home" of a certain photo of a user could be the Photos object 403. Or the "home" of a Facebook application object may be the Community object 401. Different objects or content may have different "homes" which may be a Community object 401, a Videos object 402, a Photos object 403, a Games object 404, a Featured object 405, or a Dock 406. Users may drag certain objects to a Dock 406, where they can be easily accessed by the user. The Dock may have universal inputs (or in other words, accept inputs from all types of objects), so that any type of object may be attracted to the Dock. When a user throws an object, such as Object A onto the Dock 406, the object will be easily accessible by the user from the Dock 406. When an object is placed in the Dock 406, the Dock may become the objects new "home."

Figure 5:
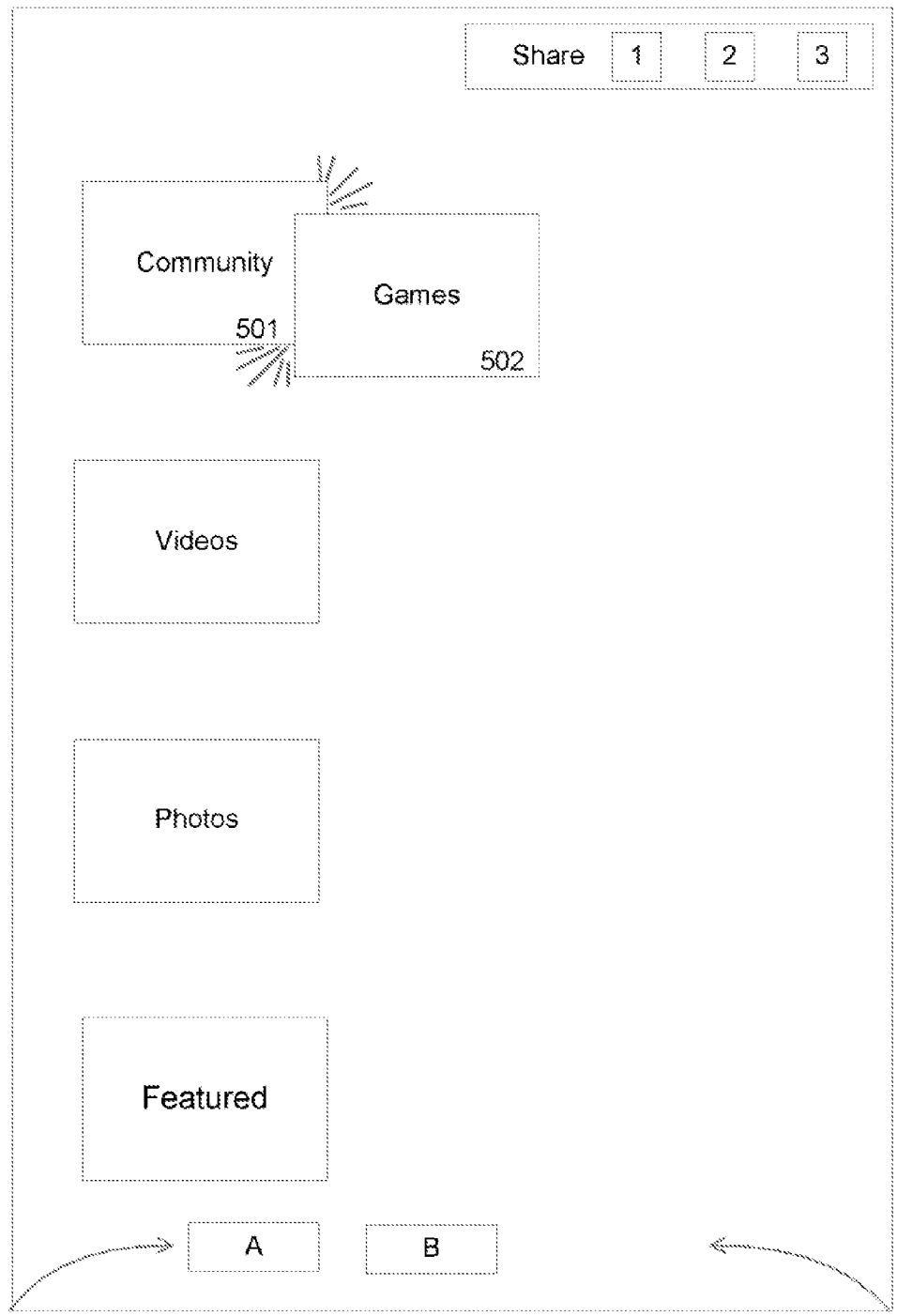
FIG. 5 illustrates an example of the interaction between two objects, in accordance with embodiments of the invention.

Referring to FIG. 5, a user may bump two objects together, such as a Community object 501 and a Games object 502, to see if they will interact, and if they do, whether they will attract or repel each other. In the case of a Community object 501 and a Games object 502, the objects coming together may result in an action. The action may be that a user's Community profile picture within Community object 501 may be utilized in a game within a Games object 502. Or, a user may have, by colliding the two objects, initiated a game within the Games object 502 with another user within the Community object 501. Or, if some information is common between the two applications, such as a user's profile information, the two applications may share this information and the information may be automatically populated from one application into another after the collision. The resulting action may be somewhat random, and the user may need to experiment and try bumping different objects together to see what happens. The result may be something new, novel and fun for the user. The goal may be to get the user interested in exploring an enterprise's brand or environment. Or, the action may be specific and intended by the user.

Figure 6:
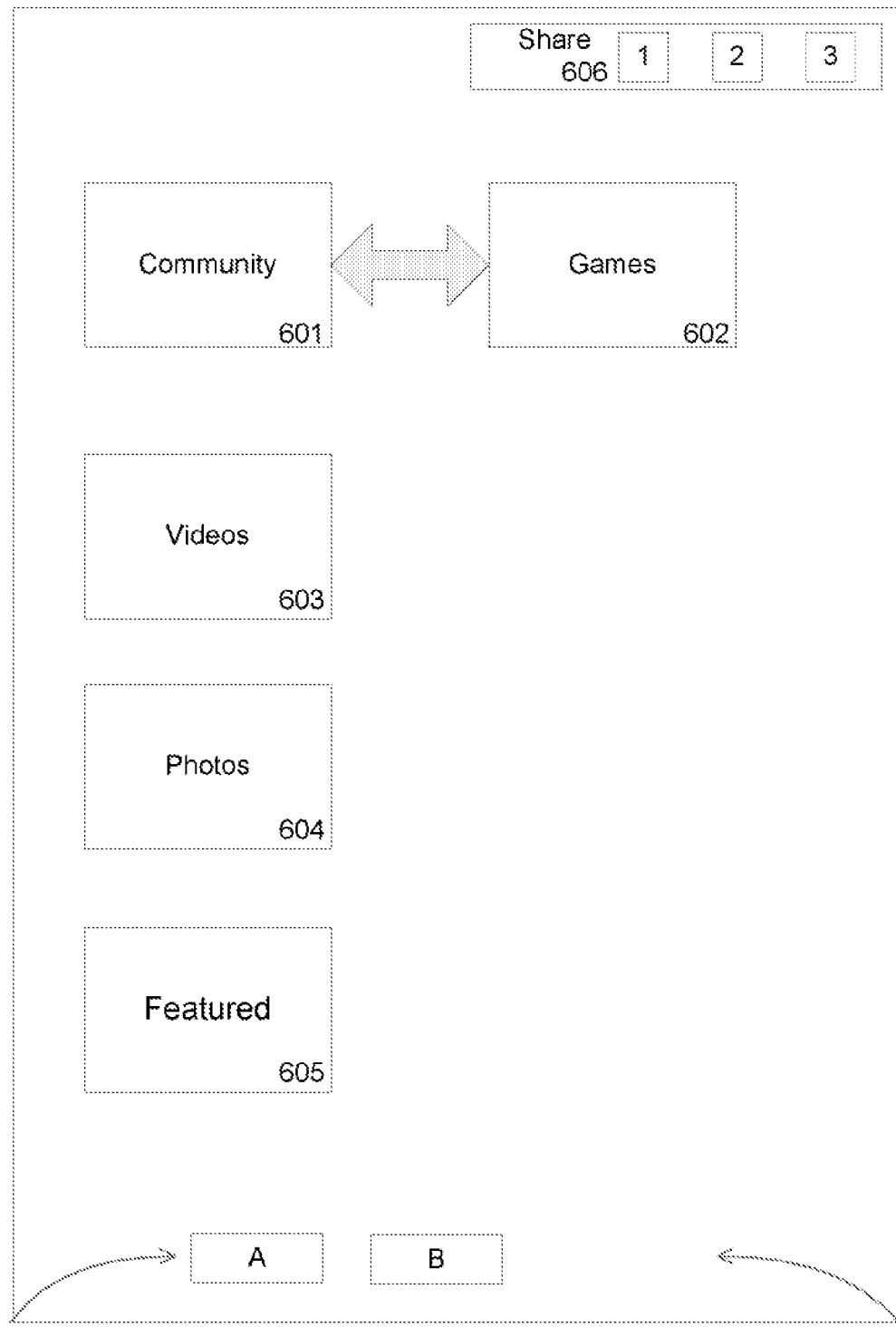
FIG. 6 illustrates an example of a user establishing a connection between two objects, in accordance with an embodiment of an invention.

Referring to FIG. 6, a user may also connect two objects together, in accordance with an embodiment of an invention. For example, two objects (or content modules) may be connected to one another so that they communicate with one another until they are disconnected. The user may, for example, use a two-finger flick, a pinch, or some other specific motion to indicate that the user would like to connect two objects together. For example, a two-finger flick may indicate that the user wants to establish a connection while a one-finger flick could indicate that the user would like the objects to engage in a one-time interaction. Alternatively, some objects may automatically establish subscription-type connections by the type of object. A user may disconnect the objects by some other manipulation, or the objects may be disconnected automatically after some period of time. Some connections may be permanent and irreversible. For example, the Games object 602 may be connected to the Community object 601 such that any achievements made by the user within the games played in the Games object 602 are posted to the user's communities within the Community object 601. In another embodiment, the Featured object 605 may be connected to a Community object 601 so that the featured content is shared through the user's social networking accounts when logged in. Or, for example, a user's profile picture within the Community object 601 may be used as a hockey puck in a hockey game within the Games object 602. In some embodiments, an object may be connected to more than one other object, or several objects may be grouped and connected to each other.

Different objects may also be "shared" to various social networks or other sites/actions represented within the "Share" object 606. For example, within the Share object 606, Facebook could be "1", Twitter could be "2", and Linked-In could be "3". A video within the Videos object 603 or a photo within the Photos object 604 may be dragged onto the "Share" object 606 to be shared and posted to these various social networks. For example, a photo within the Photos object 604 may be dragged and dropped into the upper-right hand corner of the screen shown in FIG. 6 and dropped onto the Facebook ("1") icon, and that photo would be posted to the user's Facebook wall, for example.

Figure 7:
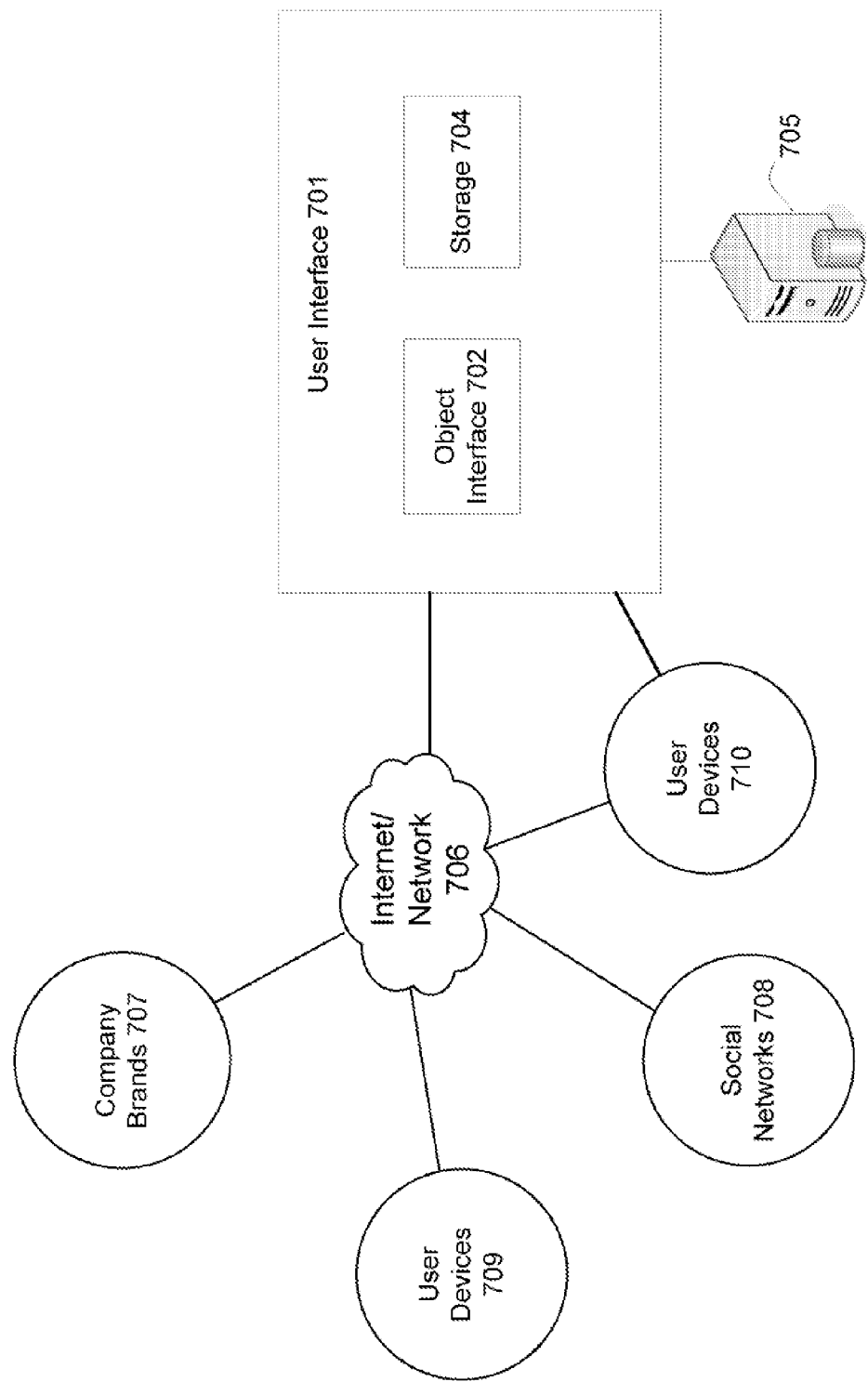
FIG. 7 illustrates an overall architecture of an object interface in the context of the user's interaction with that interface, in accordance with embodiments of the invention.

Referring to FIG. 7, an overall architecture of an object interface 702 is shown in the context of the user's interaction with that interface. Various enterprises 707 may utilize and create such interfaces 702 to be incorporated and used by users via certain user interfaces 701. The devices may be coupled to storage 704 and other processors 705. The processors 705 may be located remotely from the user devices 709, and may be accessible over a network such as the Internet 706. Thus, users may, via their user devices 709 access the user interface 701 over a network, or also locally as shown by user devices 710. The object interface 702 allows various objects to interact via behind-the scenes mapping of information to make the information compatible and transferable between applications. The Internet 706 may be coupled to Social Networks 708.

It is understood that when referring to mobile devices or mobile platforms, various other types of programmable or touch screen devices, platforms and application frameworks may be utilized by embodiments of the present invention, including mobile phones (including iPhone OS based devices, Android OS based devices, Windows mobile devices, Symbian OS and RIM OS, etc.), mobile consumer platforms (including iPod touch, Zune, PSP, Nintendo DS, etc.), tablet devices (including iPad, all Windows tablet edition devices, etc.), televisions (including Samsung SDK capable devices), "Smart Appliances" (including refrigerators, washing machines and any other appliances equipped with support for application development), automobiles and other vehicles equipped with support for application development, digital billboards and other advertisement based devices equipped with support for application development, and other programmable devices.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

While this invention has been described and illustrated with reference to particular embodiments, it will be readily apparent to those skilled in the art that the scope of the invention is not limited to the disclosed embodiments but, on the contrary, is intended to cover numerous other modifications and equivalent arrangements which are included within the spirit and scope of the following claims.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, email, etc.) over the Internet and/or other computer networks via one or more data transfer protocols (e.g., TCP, UDP, HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices. It will also be appreciated by persons skilled in the art that the term "users" referred to herein can be individuals as well as corporations and other legal entities. Furthermore, the processes presented herein are not inherently related to any particular computer, processing device, article or other apparatus. An example of a structure for a variety of these systems will appear from the description below. In addition, embodiments of the invention are not described with reference to any particular processor, programming language, machine code, etc. It will be appreciated that a variety of programming languages, machine codes, etc. may be used to implement the teachings of the invention as described herein.

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number respectively. Additionally, the words 'herein,' 'hereunder,' 'above,' 'below,' and words of similar import refer to this application as a whole and not to any particular portions of this application. When the word 'or' is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventor contemplates the various aspects of the systems and methods in any number of claim forms. Accordingly, the inventor reserves the right to add additional claims after filing the application to pursue such additional claim forms for other aspects of the systems and methods.

What is claimed is:

1. A system for displaying interoperability objects, comprising:
    a display screen comprising a user interface that displays at least a first object and a second object, wherein said first object is a graphical depiction of a first application and the second object is a graphical depiction of a second application, and wherein said first and second applications are executable on a user device upon input from a user on a respective one of said first or second object; and
    a computer processor that is programmed to initiate an action that is specific to at least one of the first application and the second application based on an interoperability dynamic of the first object with the second object and upon input from said user on said first or second object;
    wherein the interoperability dynamic is for the first and second objects to repel, attract or remain neutral with respect to each other on the user interface and based on compatibility of outputs of the first application with inputs of the second application, and
    wherein if said first and second objects attract each other on said display screen, then said first application outputs and shares content with said second application.

2. The system of claim 1, wherein the graphical depiction of each object is an icon.

3. The system of claim 1, wherein the interoperability dynamic of the objects is determined by a plurality of input and output parameters of the objects.

4. The system of claim 1, wherein the interoperability dynamic is to repel, and the first application does not share content with the second application for display on the display screen.

5. The system of claim 1, wherein the user may move the position of each object within the display screen.

6. The system of claim 1, wherein the user may rearrange the positions of objects within the display screen.

7. The system of claim 1, wherein the input from the user is the action of bumping the first object with the second object.

8. The system of claim 1, wherein the input from the user is the action of flicking the at least one object onto the second object.

9. The system of claim 1, wherein the input from the user is the action of placing the first object on top of the second object.

10. The system of claim 1, further comprising a graphical depiction of a link established between the first object and the second object, wherein the link enables the at least one object first application and the second application to share content.

11. The system of claim 10, wherein the graphical depiction of the link is a display of the second object orbiting the first object.

12. The system of claim 1, further comprising a graphical depiction of a link established between the first object and the second object, wherein the link enables the at least onefirst object to communicate with the second object based on pre-defined trigger events.

13. The system of claim 12, wherein the link is configured to be sustained for a pre-defined period of time.

14. The system of claim 12, wherein the link is configured to be sustained only for a limited period of time to allow for a brief sharing of content.

15. The system of claim 12, wherein the link further enables the first object to share messages with the second object.

16. The system of claim 1, wherein said first application is different from said second application.

17. The system of claim 1, wherein said content comprises one or more pictures and/or video.

18. A method for displaying interoperability of user interface icons comprising:
    displaying a first object that is a graphical depiction of a first application on a user interface of a display screen of a user device, wherein said first application is executable on said user device upon input from a user on said first object;
    receiving an input from said user to associate the first object with a second object, wherein the second object is a graphical depiction of a second application that is executable on the user device, which first application is different from the second application;
    displaying on the user interface an action that is specific to at least one of the first application and the second application based on an interoperability dynamic of the first object with the second object;
    wherein the interoperability dynamic is for the first and second objects to repel, attract or remain neutral with respect to each other on the user interface and based on compatibility of outputs of the first application with inputs of the second application, and
    wherein if said first and second objects attract each other on said display screen, then said first application outputs and shares content with said second application.

19. A non-transitory computer-readable storage medium having computer readable instructions stored thereon for execution by a processor to perform a method for displaying interoperability of user interface icons comprising:
- displaying a first object that is a graphical depiction of a first application on a user interface of a display screen of a user device, wherein said first application is executable on said user device upon input from a user on said first object;
- receiving an input from said user to associate the first object with a second object, wherein the second object is a graphical depiction of a second application that is executable on the user device, which first application is different from the second application;
- displaying on the user interface an action that is specific to at least one of the first application and the second application based on an interoperability dynamic of the first object with the second object;
- wherein the interoperability dynamic is for the first and second objects to repel, attract or remain neutral with respect to each other on the user interface and based on compatibility of outputs of the first application with inputs of the second application, and
- wherein if said first and second objects attract each other on said display screen, then said first application outputs and shares content with said second application.

* * * * *